(No Model.)
H. BISHOP.
Bird-Cage.
No. 228,438.  Patented June 8, 1880.
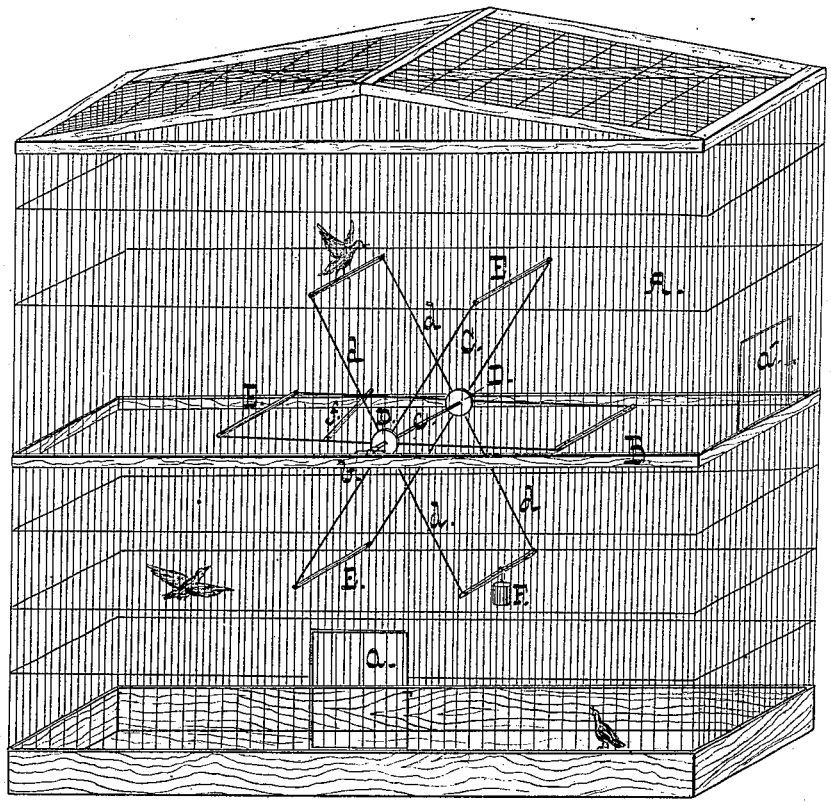
Witnesses,
W. A. Bertram
De H. Barclay
Inventor,
— HENRY BISHOP —
by
R. D. Williams
Attorney.

UNITED STATES PATENT OFFICE.

HENRY BISHOP, OF BALTIMORE, MARYLAND.

BIRD-CAGE.

SPECIFICATION forming part of Letters Patent No. 228,438, dated June 8, 1880.

Application filed March 9, 1880. (No model.)

*To all whom it may concern:*

Be it known that I, HENRY BISHOP, of Baltimore city, State of Maryland, have invented certain new and useful Improvements in Bird-Cages; and I hereby declare the same to be fully, clearly, and exactly described as follows, reference being had to the accompanying drawing, in which the device is illustrated in perspective.

My invention has reference, in particular, to that class of large bird-cages or aviaries designed to receive a number of birds; and it consists in a cage of that class, constructed as hereinafter described, and provided with a revolving perch, the features of which latter constitute also a part of my invention.

In the accompanying drawing, A is the cage, having a door, $a$, in the front and near the bottom, through which door the food and water are introduced into the cage. A lateral door, $a'$ is also provided, through which ready access is had to the perch for cleaning it.

The perch C consists of a central shaft, $c$, mounted in bearings $b$ on the center bend, B, of the cage, and provided with hubs D D, from which project a number of spokes, $d\ d$. These are connected at their outer ends by independently-revolving perches E E, as shown.

The entire device is evenly balanced upon its bearings, so as to remain in any position to which it is brought; but it is free to turn when the equipoise is destroyed as a bird alights upon one of the perches E.

As the perches are susceptible of revolution independently of the device proper, the birds have no difficulty in maintaining their positions as the device revolves.

In order to lock the perch in position and enable the birds to roost quietly at night, I hang a weight, F, on one of the perches E and insert a separate perch, $f$, through the cage above one of the radial arms $d$ on the other side. In lieu of this latter, any equivalent device may be used, such as a thumb-screw inserted through the bearing $b$ and adapted to clamp the shaft $c$. The described construction is, however, preferred, as the counterpoise F may be left upon the perch E, the perch $f$ being removed, when the device is susceptible of an oscillating movement similar to that of the branches of a tree.

The top of the cage is made removable, so that the entire perch may be removed when desired.

What I claim is—

1. In combination with a bird-cage, a revolving perch mounted upon suitable bearings therein, and provided with mechanism, substantially as set forth, for preventing at will the revolution of the perch.

2. In combination with the cage and revolving perch, a counterpoise, F, as and for the purpose set forth.

HENRY BISHOP.

Witnesses:
R. D. WILLIAMS,
JOHN C. GITTINGER.